United States Patent
Dickinson

[11] 4,007,423
[45] Feb. 8, 1977

[54] SYSTEM AND APPARATUS FOR ELECTRONIC SPECTRAL ANALYSIS

[75] Inventor: Robert V. C. Dickinson, Berkeley Heights, N.J.

[73] Assignee: Intech Laboratories, Inc., Ronkonkoma, N.Y.

[22] Filed: Dec. 9, 1974

[21] Appl. No.: 531,049

[52] U.S. Cl. .............................. 325/67; 325/308; 324/77 CS; 178/DIG. 13
[51] Int. Cl.² ..................................... H04B 17/00
[58] Field of Search .............. 325/67, 308, 309, 31, 325/53, 37, 45, 332, 370; 179/175.3 R, 1 B, 1 MN, 2 A, 2 B; 324/77 B, 77 C, 77 CS; 321/4, 6; 178/DIG. 13, DIG. 4

[56] References Cited
UNITED STATES PATENTS

| | | | |
|---|---|---|---|
| 3,153,192 | 10/1964 | Pidhayny et al. | 324/77 C |
| 3,540,049 | 11/1970 | Gaunt | 325/45 X |
| 3,624,509 | 11/1971 | Morici | 325/470 X |
| 3,676,580 | 7/1972 | Beck | 178/DIG. 13 X |
| 3,794,922 | 2/1974 | Osborn et al. | 325/53 |
| 3,868,568 | 2/1925 | Ashida et al. | 324/77 CS |

OTHER PUBLICATIONS
Bell Telephone Laboratories, "Transmission Systems for Communications" 4th ed. 1970, p. 39.

Primary Examiner—Benedict V. Safourek
Assistant Examiner—Michael A. Masinick
Attorney, Agent, or Firm—Donald P. Gillette

[57] ABSTRACT

Frequency response of a signal path over which frequency-spaced signals are transmitted is analyzed by sweeping relatively narrow pass band tunable receiving means across the frequency band expected to be received at the location to be analyzed. Incoming signal to which the tunable receiving means is tuned at any instant is used to control the frequency of a voltage controlled oscillator. The frequency of oscillations produced by the oscillator has a known relationship to the amplitude of the instantaneously received signals, and these oscillations are transmitted to a frequency-to-amplitude converter at a measuring location. The converter produces an output signal that has an amplitude which is a function of the frequency of oscillations applied to it. A spectrum indicator at the measuring location is connected to the converter to produce a visual display of the amplitude of signals received at the location at which the characteristics of the transmission path are being analyzed.

9 Claims, 6 Drawing Figures

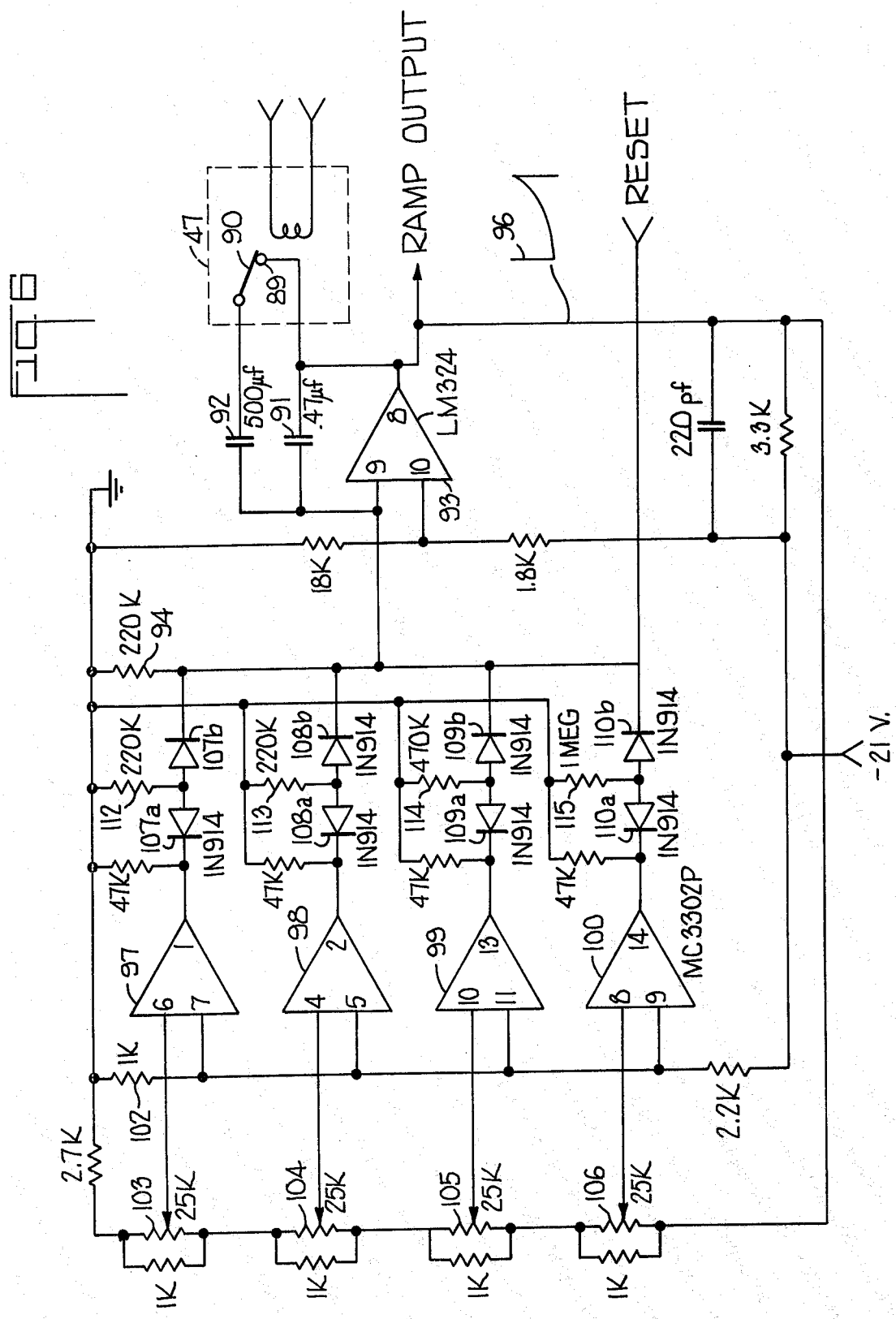

SYSTEM AND APPARATUS FOR ELECTRONIC SPECTRAL ANALYSIS

BACKGROUND OF THE INVENTION

1. Field of the Invention

This invention relates to the field of the spectral analysis of a transmission path and particularly to a system in which the spectrum of signals received at a remote location is analyzed and displayed at a measuring location.

2. The Prior Art

In certain types of electronic signal transmission systems such as community antenna television (CATV) systems or cable transmission systems for transmitting television signals or other relatively side band signals, usually from a central location to a plurality of remote locations, it is important that the signals be transmitted in their entirety without the loss of signals in a part of the frequency band and certainly without the loss of all of the signals. Heretofore, the operators of such systems have had to depend upon routine maintenance or, usually, immediate complaint by system subscribers in the event of partial or total loss of signals at the subscriber's location. It is common for the transmission path between the central location and the subscriber's location to include a number of links and connections, and any part of the transmission path may include the point of signal loss. It is a time consuming procedure to trace out the signal passage along the transmission path to locate the point of loss. Such service is also costly, not only from the standpoint of the time of the people involved in the maintenance and their travel costs in reaching the maintenance locations, but frequently also in the costs of blocking traffic to reach a transmission cable in an underground conduit.

It is one of the principle objects of the present invention to measure transmission characteristics of a transmission path by scanning a relatively narrow band receiving means across the band of signals that should be received at a predetermined remote location, transforming the received signals into a signal that can be transmitted to a central location, and displaying the transformed signals to show the transmission characteristics of the transmission path as measured at the remote location.

Another object of the invention is to provide such analysis on an automatic basis.

A further object of the invention is to provide the analysis in sequence for a number of such remote locations.

Further objects will become apparent from the following specification together with the drawings.

SUMMARY OF THE INVENTION

In accordance with the present invention, a spectral analysis system is provided for analyzing the amplitude versus frequency characteristics of a transmission path along which signals are transmitted within a predetermined frequency band. The signals also have a predetermined amplitude relationship with respect to each other. The system comprises tunable receiving means at a location on the path, such receiving means having a relatively narrow pass band tunable over the predetermined frequency band; amplitude responsive means connected to the receiving means to receive the output signal therefrom and having a predetermined transfer characteristic to produce an output signal having a predetermined amplitude relationship with respect to the amplitude of the signals received at the location and within the pass band of the receiving means at any predetermined time; a voltage-controlled oscillator connected to the amplitude responsive means to be controlled by the output signal therefrom to cause the instantaneous frequency of oscillations of the oscillator to have a predetermined relationship to the amplitude of signals received at the location at that instant within the pass band of the receiving means; a frequency-to-amplitude converter connected to the voltage-controlled oscillator to translate the instantaneous frequency thereof to a voltage having an amplitude that is a function of such frequency; and visual indicating means connected to the converter to display the instantaneous amplitude of the output signal of the converter.

BRIEF DESCRIPTION OF THE DRAWINGS

FIG. 6 is a schematic circuit diagram of a ramp signal generator to be connected to the decoder and reset circuit of FIG. 5 and to the input circuit of FIG. 3.

DETAILED DESCRIPTION OF THE PREFERRED EMBODIMENTS

Figure 1:
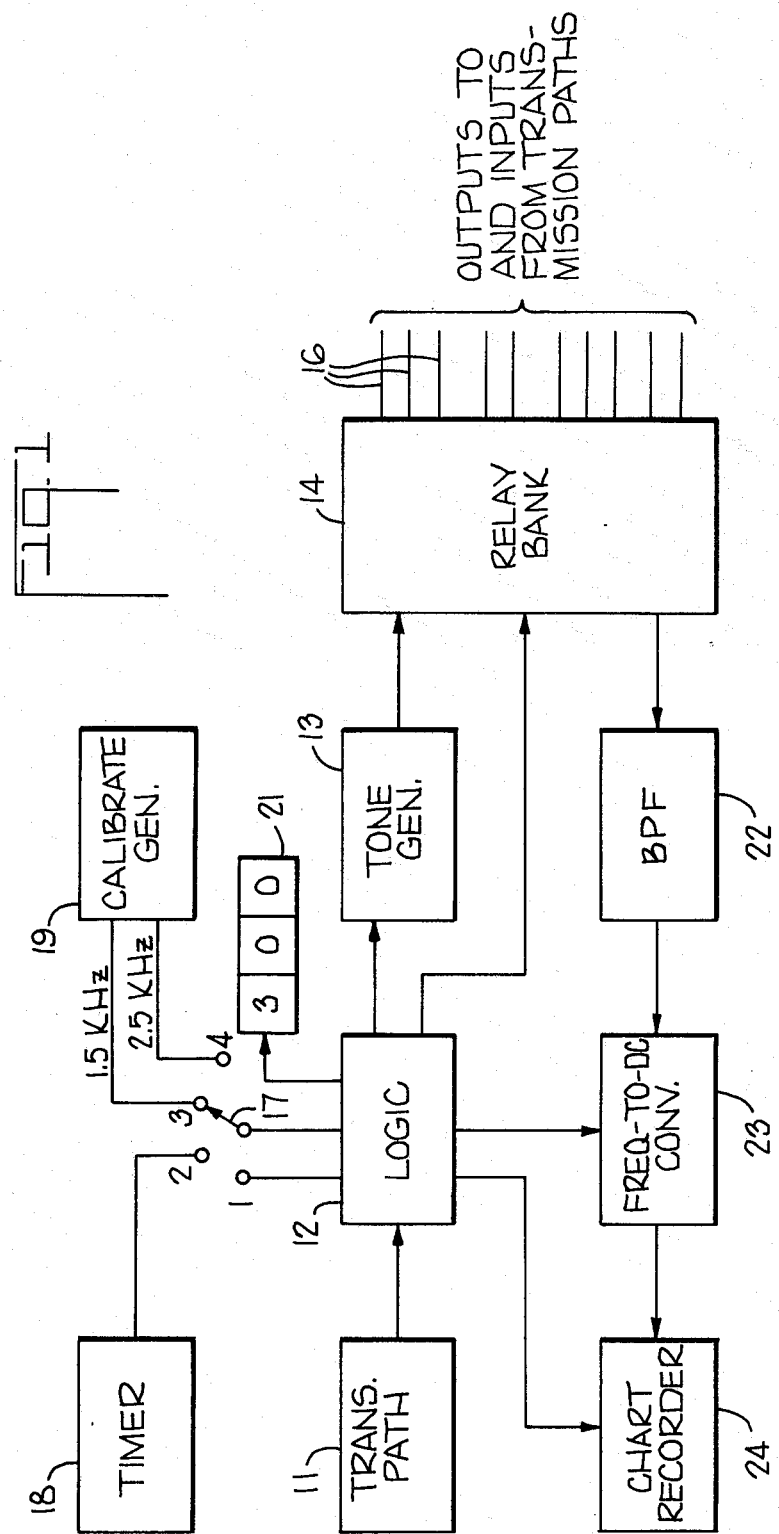
FIG. 1 is a block diagram of a central monitoring station capable of controlling and responding to spectral analyzing equipment at a number of remote locations in accordance with this invention.

The block diagram in FIG. 1 illustrates the connections of typical components to be used in the system of the present invention. The circuit includes a transmission path selector 11 that may be a multi-position switch or a keyboard switch or the like. The switch 11 is connected to a logic circuit 12 to control the operation of the logic circuit. The logic circuit is connected to a tone generator 13 and to a relay bank 14 that has a plurality of output terminals 16, each of which is connected to a separate remote analyzer. The logic circuit 12 is also connected to the relay bank 14 to determine which of the terminals 16 will be in use at any given time.

The logic circuit 12 is further connected by means of a multi-position switch 17 to a timer 18 and a calibration generator 19. In addition the logic circuit is connected to a numerical display 21 that indicates the position of the arm of the switch 17 and the particular one of the transmission channels 16 currently undergoing spectral analysis.

A band pass filter 22 is also connected to the relay bank 14 to receive signals transmitted back to the particular one of the terminals 16 in operation. The output of the band pass filter 22 is connected to a frequency-to-DC converter 23 that is also connected to the logic circuit 12 for calibration purposes. The output of the frequency-to-DC converter 23 is connected to a chart recorder 24 and the chart recorder is also connected to the logic circuit 12.

Before describing the operation of the circuit in FIG. 1, the block diagram of the remote analyzer in FIG. 2 will be described. The remote analyzer includes in input terminal 26 connected to a transmission path such as a cable 27 that extends between a source 28 and, usually, several receiving connections such as the terminal 26 and an additional terminal 29, similar to the terminal 26.

The terminal 26 is connected to the input of a tunable receiving means 31 which, in this instance is illustrated as a conversion circuit tunable over a band of frequencies from 50MHz to 300MHz. The circuit 31 may typically be a double conversion circuit to convert the incoming signals in the 50 to 300MHz band to a higher frequency, such as about 375MHz. For this purpose, the circuit 31 includes a voltage-controlled oscillator (VCO). The circuit 31 further includes a second converter to convert from 375MHZ to 60MHz. A double conversion circuit of the type can be purchased from Jerrold Electronics, Inc.

The output 60MHz signal is then connected to another conversion circuit 32 to be converted to an intermediate frequency (I.F.) of 10.7MHz. This conversion circuit has a filter circuit 33 with a relatively narrow pass band of 200KHz between points at which its response is down 3dB from the center frequency. The filter has a relatively sharp drop-off on each side of the 10.7MHz center frequency and is down approximately 60dB at frequencies of 10.7MHz ± 400KHz.

The output signal of the filter 33 is connected to a logarithmic amplifier 34 having a dynamic range of at least 70dB. This amplifier provides output signals to a local test point 36 for monitoring the output of the amplifier and to a VCO 37 that serves as a DC-to-frequency converter. The output of the VCO 37 is connected to one winding 38 of a transformer 39. A second winding 41 of the transformer is connected to a 600 ohm telephone line 42 which, in turn, is connected to one of the terminals 16 in FIG. 1.

The transformer 39 has another winding 43 connected to a low pass filter 44 to receive signals from the telephone line 42. The filter 44 is connected to a tone decoder 46 that is connected to the normally-open terminal of a relay 47. The tone decoder 46 is also connected to a driver circuit 48 that controls the operation of the relay 47. A ramp signal generator 49 is connected to the arm of the relay and is also connected to a reset circuit 51. An output of the reset circuit 51 is connected to the normally-closed terminal of the relay 47 and to the driver circuit 48. The ramp output signal from the generator 49 is connected to a control input terminal of the circuit 31 to control the operation of the VCO in the latter circuit in order to sweep the tuning across the incoming frequency band.

Figure 2:
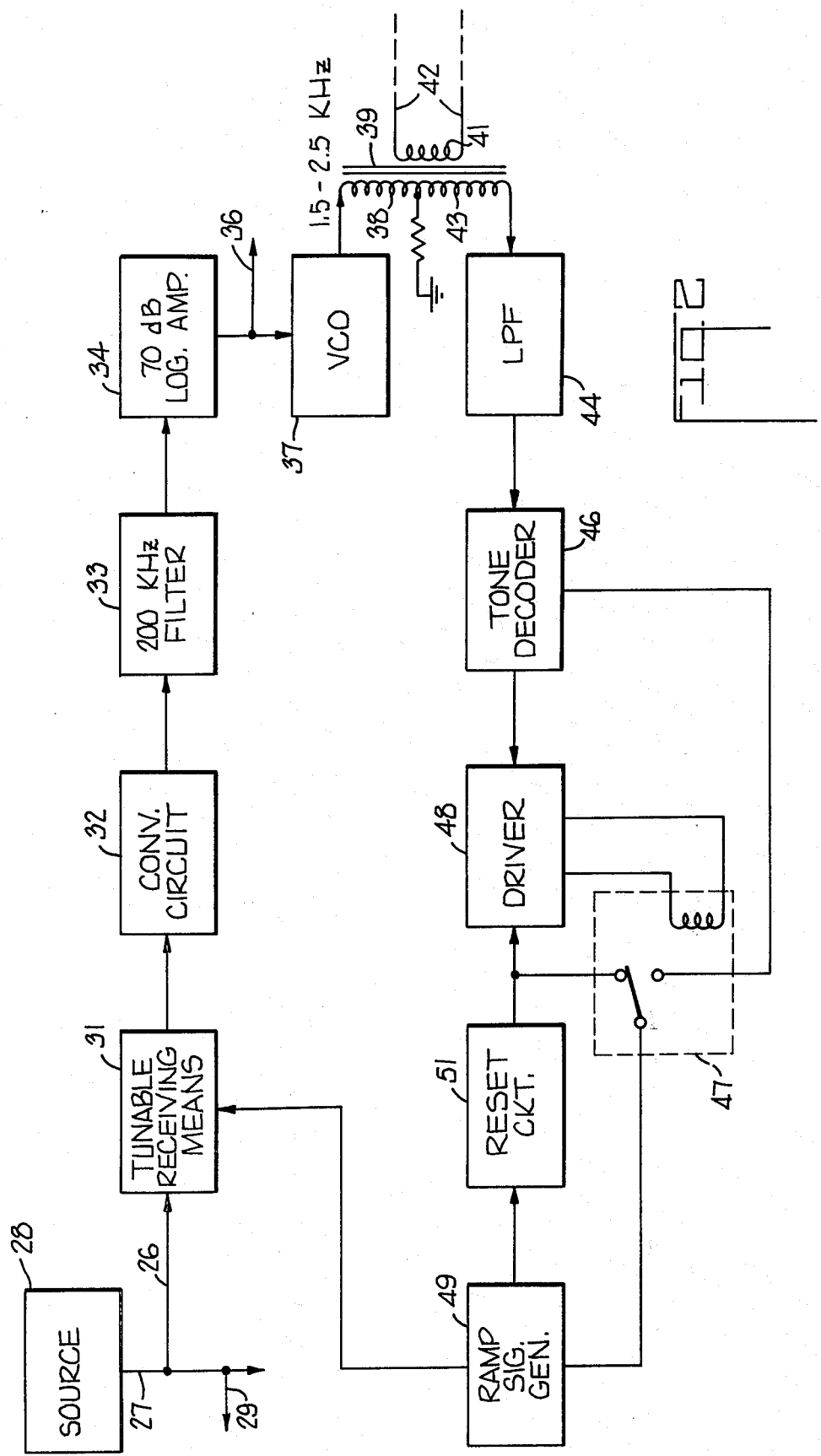
FIG. 2 is a block diagram of a remote analyzer for use in conjunction with the apparatus of FIG. 1 in accordance with this invention.

The operation of the system in FIGS. 1 and 2 is based on the spectral analysis of signals at the input terminal 26 and of corresponding input terminals such as the terminal 29 for other remote locations. Normally these signals are generated at the source 28 and travel along the transmission path 27 to the input terminals 26 and 29 and such other input terminals as may be connected to receive signals from the transmission path 27 in the overall system. However, it is possible to have signals generated in more than one source connected to the path 27 and still reach the input terminal 26.

The circuit 31 is a straight forward double conversion super heterodyne input circuit that provides an output signal at a frequency of about 60MHz for any input signal within the desired band supposed to be received at the input terminal 26. The conversion circuit 32 further reduces the frequency to about 10.7MHz and this signal is filtered by the filter 33 to pass only a very narrow band ± 100KHz out of the total band of frequencies applied to the input terminal 26. Thus, the signal that passes through the filter 33 at any given instant would be only a small part of the relatively wide band incoming signal, and the exact frequency of this small part is determined by the tuning of the VCO in the double conversion circuit 31. By driving this VCO with the ramp generator 49, the 200KHz segment of the incoming signal at the terminal 26 is swept across the selected band of 50 to 300MHz. This band covers all of the television frequencies for both VHF and UHF operation and also covers the FM frequencies used commercially. The pass band of 200KHz for the filter 33 is selected to be less than the required frequency separation of FM channels, which have a spacing of 400 KHz between adjacent center frequencies.

It should be understood that the specific frequencies to which reference has been made, such as 50 to 300MHz for the band of frequencies applied to the input terminal 26, and the 200 KHz width of the pass band of the filter 33 are not to be considered as limiting the invention. For example, some systems require that the circuit 31 sweep across a band of 5 MHz to 130 MHz. The width of the pass band of the filter should be narrow compared to frequencies to be spectrally analyzed.

The output signal of the filter 33 has an amplitude that corresponds to the amplitude of the narrow segment of the input frequency that passes through the filter at any given instant as the tuning of the conversion circuit 31 is swept across the selected band. The output signal of the filter 33 is applied to the logarithmic amplifier 34 that operates in such a way as to produce a DC signal that has an amplitude that corresponds to the amplitude of the input signal at the terminal 26. However, the correspondence is not a linear correspondence but a logarithmic one to facilitate the spectral analysis of the incoming signal at the input terminal 26 on the basis of the dB difference between signals of different frequencies.

The output signal of the logarithmic amplifier 34 is referred to as a DC signal. This is not to be construed as meaning that its amplitude is constant; the amplitude of the signal varies in accordance with the logarithm of signals within the 200 KHz pass band of the filter 33 at any given instant as that pass band is, in effect swept across the entire incoming band of 50 to 300 MHz. The varying amplitude signal is applied to control the frequency of the VCO 37 between a low frequency that has been arbitrarily selected as 1.5 KHz and an upper frequency that has also been arbitrarily selected as 2.5 KHz. The logarithmic amplifier 34 is operated so that its output signal level causes the VCO 37 to oscillate at 1.5 KHz when the output signal amplitude is as low as possible and is essentially the noise signal generated in the amplifier 34 and circuits preceding it. The 2.5 KHz upper limit corresponds to an output signal of the amplifier 34 100dB above the noise level. In fact, it is not expected that the maximum output signal of the amplifier 34 reach a level 100dB above the noise level. However, the VCO 37 is capable of being shifted to such a frequency.

It will be noted that the difference between the low frequency output of the VCO 37 and the high frequency output thereof is 1 KHz and that this has been determined to correspond to an increase of 100dB in the amplitude of the output signal of the amplifier 34. It is desired that the ratio of the controlling signal applied to the VCO 37 to the frequency of oscillations produced by the VCO be linear. This is equivalent to saying that each change of 1dB of the input signal at the terminal 26 produces a change of 10 Hz in the frequency of the VCO 37.

The variable frequency output of the VCO 37 is applied by the transformer 39 to the telephone line 42. It will be noted that the frequencies produced by the VCO are well within the frequency band of a voice-grade telephone transmission line. It would be possible to expand the frequencies actually used to occupy a larger band, for example, from about 300 cycles to 3KHz, but the range of 1.5 to 2.5Hz is sufficient. Moreover, the band of 1.5 to 2.5KHz leaves a lower band of frequencies below 1.5KHz for receiving signals applied through one of the terminals 16 to the respective telephone line 42 to control the operation of the apparatus depicted by the block diagram in FIG. 2. Typically, a frequency of 625Hz may be transmitted from one of the terminals 16 in FIG. 1 along the respective telephone line 42 to the transformer 39 through which it can pass and be applied to the low pass filter 44. The low pass filter transmits the 625Hz signal from the winding 43 but prevents any transfer of signals in the frequency band of 1.5 to 2.5KHz from reaching the tone decoder 46 even if there is some leakage from the winding 38 to the winding 43 of the transformer 39.

The 625Hz signal that does pass through the filter 44 actuates the tone decoder 46 to produce an output signal that actuates the driver 48 which in turn switches the arm of the relay 47 from its normally-closed contact to its normally-open contact. This permits an output signal from the tone decoder 46 to reset the ramp generator 49 to its starting point. From that point the ramp signal generated by the generator 49 increases and shifts the frequency of the VCO in the dual conversion generator 31 to cause the tuning of the conversion circuit to scan across the band of frequencies that should be received at the terminal 26. In so doing it is necessary to allow sufficient time for signals to pass through the filter 33 without being attenuated due to a lack of time necessary to allow the response of this narrow band filter to reach its full value. It has been found that if the signal generated by the ramp generator 49 takes about 70 seconds to sweep the VCO in the double conversion circuit 31 across the band necessary to convert any incoming signals in the 50 to 300MHz band to the desired output frequency of 60MHz.

When the ramp signal reaches a predetermined level, it actuates a 150ms reset circuit 51. This deactivates the driver circuit 48 and allows the arm of the relay 47 to return to its normally-closed contact, which is connected to the output of the reset circuit 51, and thereby applies a resetting signal to the ramp generator 49 to return the output signal level of the ramp generator to its original value. This completes the necessary scanning of the incoming signals at the terminal 26.

The signals in the band of 1.5 to 2.5KHz transmitted along the telephone line 42 are applied to a particular one of the terminals 16 in the control circuit of FIG. 1. This terminal is connected by means of the relay bank 14 to the band pass filter 22 that transmits signals within the 1.5 to 2.5KHz band. These filtered signals are applied to the frequency-to-DC converter 23 in which they are returned to a DC signal form that has an amplitude that corresponds linearly to the frequency that is applied at any instant to the converter 23. This signal corresponds to the signal applied to the VCO 37 in FIG. 2, and thus corresponds to the logarithm of the amplitude of the instantaneous narrow band of signals applied to the input terminal 26 and converted so that they can pass through the narrow band filter 33. The DC signal from the converter 23 is applied to a pen of the chart recorder 24 to trace out a pattern that corresponds to the spectral signal applied to the input terminal 26 in FIG. 1.

Thus, the signal that carries spectral analysis information from the location of the apparatus shown in FIG. 2 to the location of that shown in FIG. 1 is simply a variable frequency signal and is basically independent of any amplitude distortion that might be present in the telephone line and related equipment. The information need not be sent over a telephone line but may be sent over some other transmission medium. A telephone line is likely to be the cheapest and most easily available.

The circuit in FIG. 1 also determines whether the signal to be analyzed is the signal at the input terminal 26 or the signal at the input terminal 29 or the signal at some other input terminal. The selection is accomplished by the transmission path selector switch 11. This switch may be simply a multi-position switch that could be connected directly through the logic circuit 12 to control individual relays in the relay bank 14 to actuate any desired one of the terminals 16. If there are many such terminals, it may be desirable to use a keyboard as the transmission path selector switch 11. Then the logic circuit 12 will have to be responsive to output signals of the type normally associated with a keyboard in order to generate the necessary signal to control the correct relay in the relay bank 14.

The logic circuit 12 also provides a signal to actuate the last two digits of the numerical indicator 21 to show which one of the terminals 16 is activated corresponding to the desired terminal 26, 29, etc. The logic circuit 12 also controls the tone generator 13 that generates the 625Hz signal to actuate the ramp generator 49 in FIG. 1 at the selected remote analyzer. Although the ramp generator has been indicated taking 70 seconds to complete one cycle of operation, it has been found sufficient to arrange the logic circuit 12 to cause the tone generator 13 to produce a 4 second burst of the 625Hz signal, and it is not necessary that the tone be sent out for the entire 70 second interval.

In setting the control circuit in FIG. 1 into operation initially, it is necessary to calibrate the frequency-to-DC converter 23 and the chart recorder 24. Since the minimum signal level corresponds to a frequency of 1.5KHz applied to the frequency-to-DC converter 23, the control circuit in FIG. 1 provides a calibration generator 19 that produces a 1.5KHz signal which is connected to the third terminal of the switch 17. The calibration generator 19 also provides a 2.5KHz signal connected to the fourth terminal of the same switch. By setting the arm of the switch 17 on terminal 3, as indicated, the 1.5KHz signal is applied through the logic circuit 12 to the converter 23 to generate an output signal that should cause the pen of the chart recorder 24 to move to the 0dB signal position. If necessary, manual adjustments in the chart recorder or in another part of the circuit may be used to cause the pen to reach the proper position. Shifting the arm of the switch 17 to the fourth terminal applies the 2.5KHz signal from the calibration generator 19 to the converter 23 and should cause the pen of the chart recorder 24 to move to a position indicating a 100dB signal. Another manual adjustment may be made to cause the pen actually to reach the proper position. As a result of this calibration procedure, which may have to be repeated several times, it can be assumed that a 0dB signal applied to the input terminal 26 in FIG. 2 will cause the pen of the chart recorder 24 to draw a line at the 0dB position on the chart and that a signal of any higher dB level will cause the pen of the chart recorder 24 to shift to a corresponding position on the chart.

It is frequently desirable to cause the system to analyze in succession the frequency spectrum at each of the input terminals 26, 29, and so on. This can be accomplished by shifting the arm of the switch 17 to the second position which is connected to a timer 18. The timer 18 provides a signal to the logic circuit 12 to actuate it to cause each of the relays in the relay bank 14 to be activated in succession but at a slow enough rate to allow the spectrum of signals at each of the input terminals 26, 29, and so on to be completely analyzed. This requires that the timer 18 produce an output signal to the logic circuit 12 to cause each of the relays in the relay bank 14 to be activated for at least a period of 70 seconds in accordance with the duration selected for generation of the ramp signal by the ramp generator 49 in FIG. 1.

If it is desired to analyze the spectrum of only a single input terminal 26 or 29 etc. in FIG. 1, the arm of the switch 17 may be connected to its first terminal, thereby causing the logic circuit 12 to activate only that one of the relays in the bank 14 that is selected by the transmission path selector switch 11. The first digit of the numerical display 21 indicates the mode of operation of the logic circuit 12. As may be seen, there is a "3" in that first numerical position, corresponding to the fact that the arm of the switch is in its third position. It should be understood that the switch 17 may have other positions corresponding to different timing rates.

Figure 3:
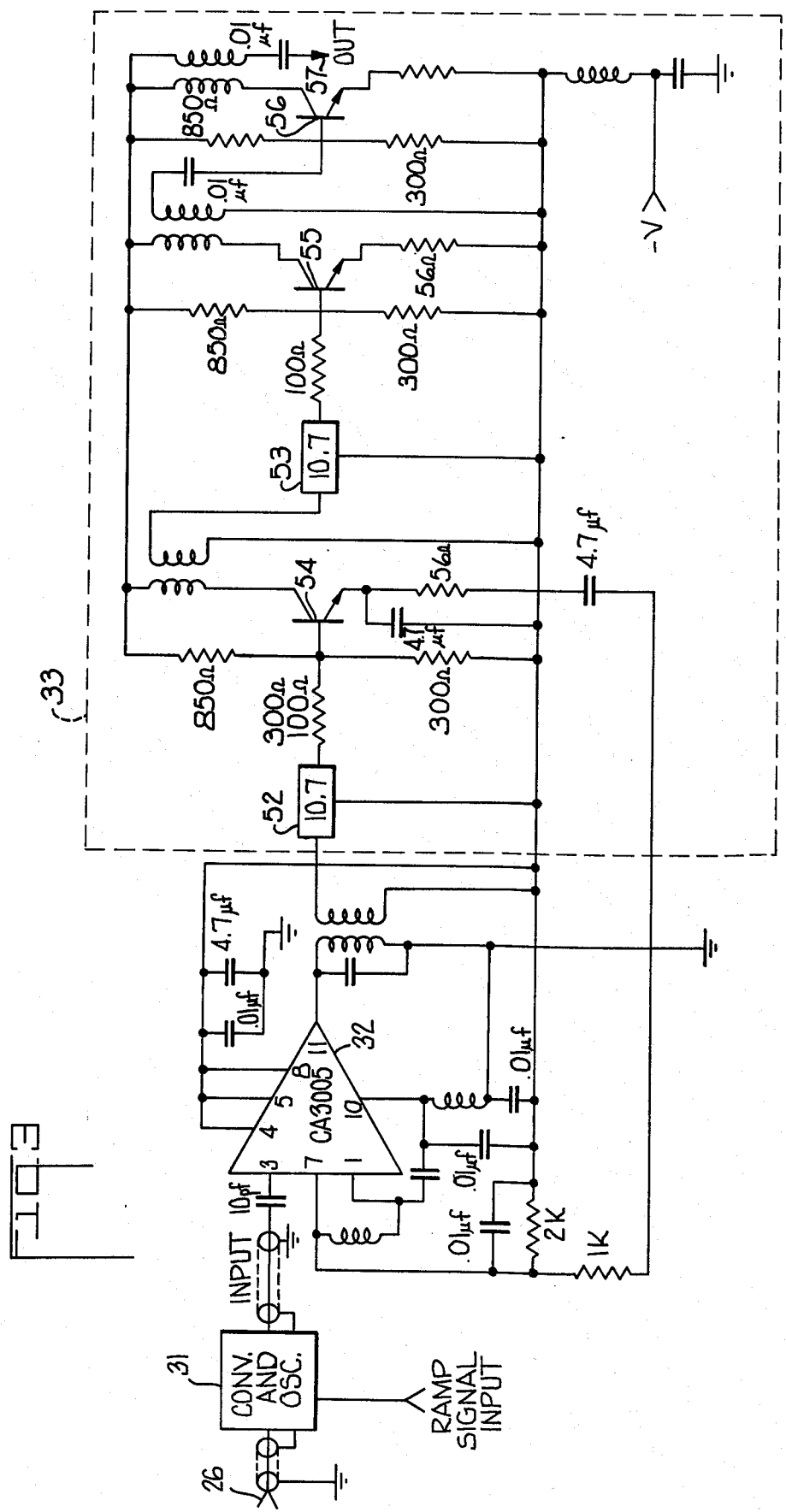
FIG. 3 is a schematic circuit diagram of a tunable receiving input circuit for use in the apparatus in FIG. 2.

FIG. 3 shows the section of the circuit in FIG. 2 between the input terminal 26 and the output of the filter 33. In particular, it shows connections for the conversion circuit 32, including tuned circuits associated with both the mixer and local oscillator sections thereof. The element indicated simply as a filter 33 in FIG. 2 is illustrated in FIG. 3 as including a complete intermediate-frequency (I.F.) amplifier with tuned circuits 52 and 53 and transistor stages 54–56. The I.F. circuit operates in the standard way to amplify the signals within the narrow band of ± 100 KHz of 10.7 MHz, and the output signal is available at a terminal 57.

Figure 4:
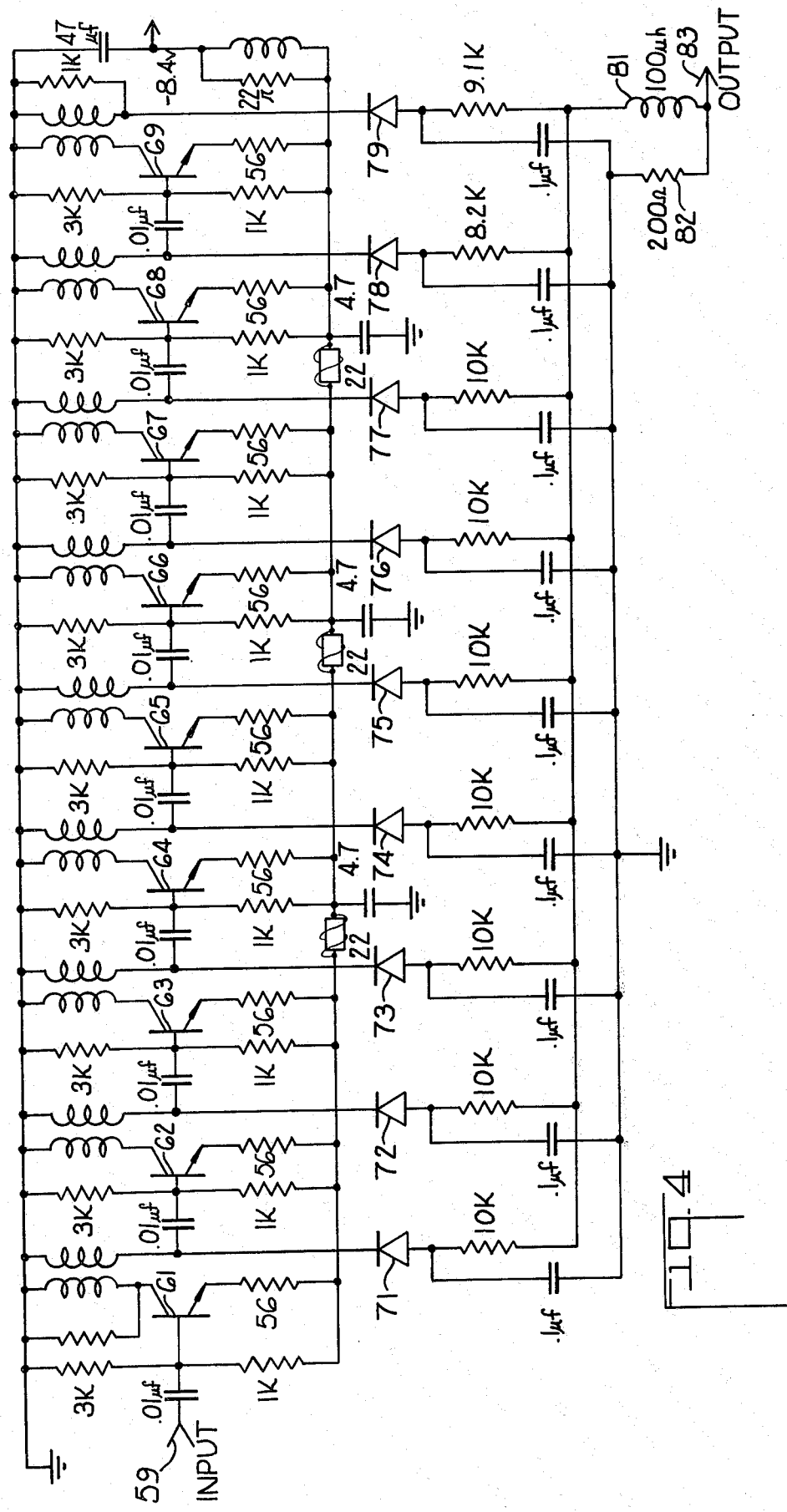
FIG. 4 is a schematic circuit diagram of a logarithmic amplifier to be connected to the output of the circuit in FIG. 3.

FIG. 4 is a schematic diagram of a logarithmic amplifier suitable for use as the amplifier 34 in FIG. 2. This amplifier has an input terminal to be connected to the output terminal of the I.F. amplifier circuit in FIG. 3. Each stage of the logarithmic amplifier includes a transistor 61–69 with a diode 71–79 connected to the output circuit thereof. Each of the diodes is connected to a common load that includes a coil 81 and a relatively low impedance resistor 82.

In the operation of the amplifier in FIG. 4, each stage has a gain of 10dB. The amplifier stage 69 is saturated in response to the lowest available signal level, which is basically the noise level. As the input signal at the input terminal 59 increases 10dB, the next stage 68 becomes saturated and supplies a fixed amount of current to the load resistor and increases the voltage thereacross by a fixed increment. Each successive increase of voltage of 10dB to the terminal 59 causes the next lower-numbered transistor to become saturated and to add another fixed increment to the voltage across the load resistor 82, as measured at an output terminal 83. Thus, the voltage across the resistor 82 is a linear function of dB, or a logarithmic function of the input voltage applied to the terminal 59. The latter voltage is a linear function of the voltage applied to the input terminal 26 in FIG. 3.

Figure 5:
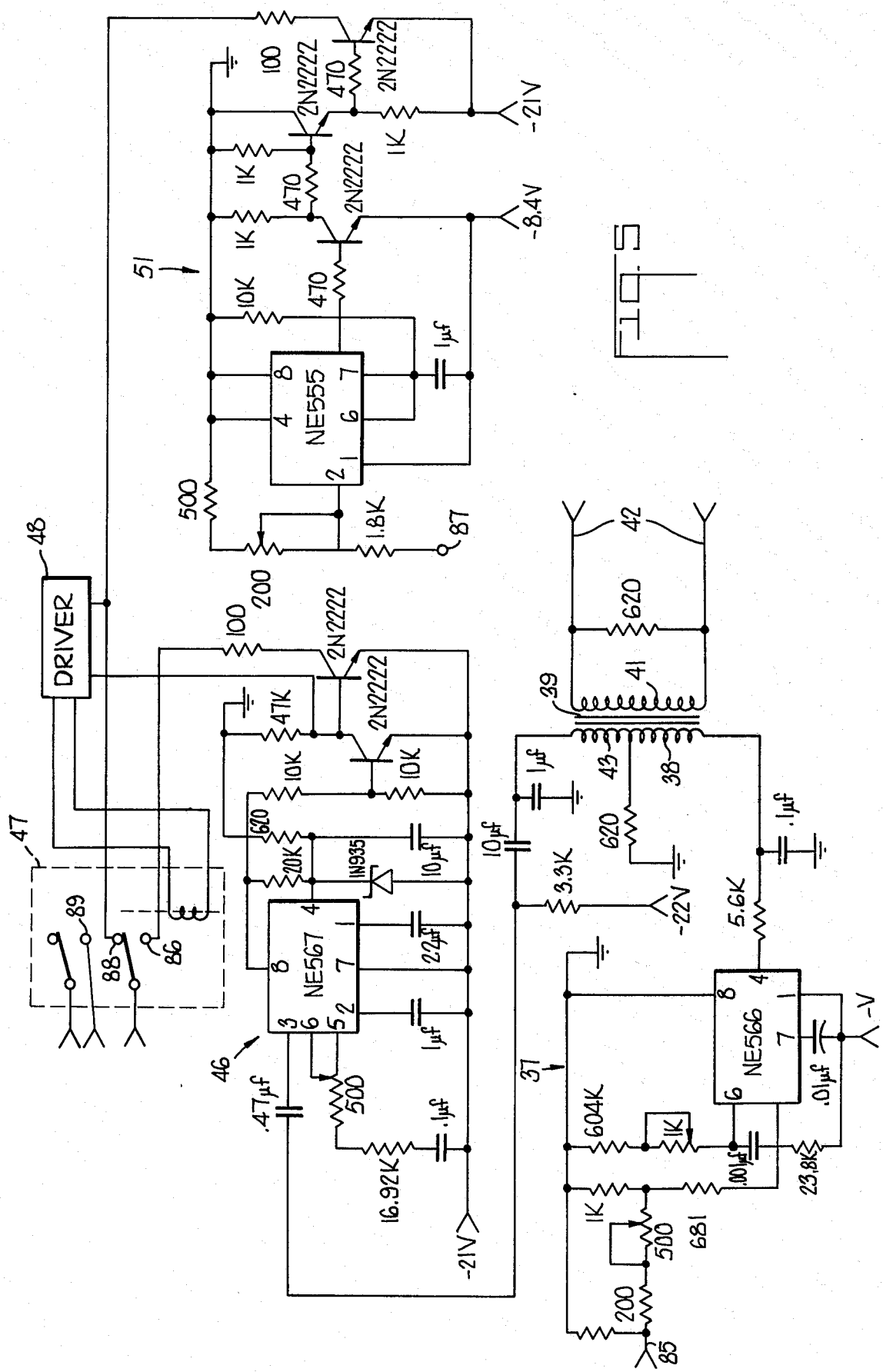
FIG. 5 is a schematic diagram of a voltage-controlled oscillator and connection circuit to a telephone line, a tone-signal decoder, and a reset circuit to be used in the apparatus in FIG. 2.

FIG. 5 shows a circuit for the VCO 37 in FIG. 2. This circuit has an input terminal 86 connected to the output terminal 83 of the logarithmic amplifier in FIG. 4. The output of the VCO 37 is connected to the transformer winding 38 to be coupled to the telephone line 42.

Signals that set the remote analyzing apparatus into operation are relatively low frequency tone signals transmitted from the central monitoring station of FIG. 1 over the appropriate telephone line. In this case the telephone line over which the tone signal is received is the same line 42 over which the spectral analyzing signal from the VCO 37 is sent to the central monitoring station. This makes it necessary to use a tone frequency within the pass band of the telephone system but not within the 1.5KHz to 2.5KHz band used to carry the spectral analysis information. 625KHz is a suitable tone frequency.

The 625Hz tone passes through the transformer 39 and is filtered and applied from the winding 43 to the decoder 46. The decoder generates a clamping output signal that is connected to the relay driver circuit 48 and to the normally-open contact 86 of the relay 47.

FIG. 5 also includes a schematic diagram of the reset circuit 51. This circuit has an input terminal 87 to receive signals from the ramp signal generator 49 (FIG. 2) and an output circuit connected to the normally-closed terminal 88 of the relay 47 and to the driver circuit 48.

When a 625Hz tone signal is received over the line 42 and applied to the decoder 46, the resulting clamping signal that actuates the relay driver 48 circuit and the relay 47 causes the ramp signal generator to drop its output voltage to the starting level.

The 625Hz tone signal is generated for only a relatively short interval of 4 seconds compared to the 70 seconds necessary to generate the ramp signal. However, the ramp signal applied to the terminal 87 holds the reset circuit 51 in a condition such that it continues to actuate the driver circuit 48 after the 625Hz tone signal has terminated and until the ramp signal reaches a level at the end of about 70 seconds to actuate the reset circuit. The reset circuit 51 then generates an output signal condition that allows the driver circuit 48 to permit the relay 47 to return to its unenergized condition.

The relay 47 in FIG. 5 has an extra normally-open contact 89 and an arm that engages that contact when the relay is energized. The contact 89 and arm are shown in FIG. 6 connected to one terminal of a capacitor 91 and to one terminal of a capacitor 92. The capacitor 91 is permanently connected as an integrating capacitor in an integrating circuit that comprises a differential amplifier 93. The capacitor 91 has a relatively small capacitance and would generate a relatively, rapidly rising sawtooth waveform. The capacitor 92 has a much larger capacitance and, in combination with the resistor 94 has a very long time constant. It is this long time constant that generates a relatively long ramp signal 96 of about 70 seconds when the arm 90 of the relay 47 is brought into contact with the normally-open contact 89.

The ramp waveform is required to be non-linear and to increase more rapidly with the passage of time during the 70 second interval in order to apply the necessary ramp signal to the circuit 31 (FIG. 3) to cause the VCO in the circuit 31 to sweep the frequency linearly with respect to time.

The non-linear ramp signal 96 is produced by providing a plurality of amplifiers 97–100, each having one terminal connected through a resistor 102 to a power supply terminal, which in this case is ground. The other terminal of the amplifiers 97–100 is connected to the arm of a respective potentiometer 103–106. These potentiometers are all connected in series across the output terminal of the integrator 93 so that the ramp signal 96 is applied across them. The amplifiers 97–100 are, preferably, Norden amplifiers that respond to changes in current. The input terminals of the amplifiers 97–100 connected to the arms of the potentiometers 103–106 cause the amplifiers to become conductive at different points along the ramp signal 106. The output terminal of each of the amplifiers 97–100 is connected in series with two oppositely polarized diodes 107a, 107b-100a, 110b, to the junction to the resistor 94 and the capacitor 92. The junction between each pair of diodes 107a, 107b – 110a, 110b is connected to the power supply terminal by a resistor 112–115 of the proper resistance such that, as the ramp signal 96 progresses, each of the resistors 112–115 in turn is placed in parallel with the resistor 94, starting with the resistor 115 and working up to the resistor 112. The addition of each resistor decreases the time constant and causes the capacitor 92 to charge more quickly. The same charging takes place if the capacitor 92 is not connected in the circuit, but the capacitor 91 charges at a much faster rate than does the capacitor 92.

The resetting of the integrator 93 is accomplished when the ramp output signal 96 reaches a certain level that actuates the reset circuit 51 (FIG. 5). This de-energizes the driver 48 in FIG. 5 and allows the relay 47 to permit its arms to return to the position shown in that figure in which they are in contact with the normally-closed terminals. Thereafter the circuit waits for another 625Hz tone to begin another cycle of operation as a spectrum analyzer.

While this invention has been described in terms of specific embodiments, it will be understood by those skilled in the art that modifications may be made therein within the true scope of the invention as defined by the following claims.

What is claimed is:

1. In a system in which signals are transmitted along a first transmission path and such signals are within a predetermined wide frequency band and have a predetermined amplitude relationship with respect to each other, a spectral analysis system for analyzing the amplitude versus frequency characteristics of said path, the system comprising:
   A. tunable receiving means at a location on said path, said receiving means having a relatively narrow pass band tunable over said frequency band;
   B. amplitude responsive means connected to said receiving means to receive the output signal therefrom and having a predetermined transfer characteristic to produce an output signal having a predetermined amplitude relationship with respect to the amplitude of the signals received at said location within the pass band of said receiving means at any predetermined time;
   C. a voltage controlled oscillator connected to said amplitude responsive means to be controlled by the output signal therefrom to cause the instantaneous frequency of oscillations of said oscillator to have a predetermined relationship to the amplitude of signals received at said location at that instant within the pass band of said receiving means, the frequency of oscillations of said oscillator being much lower than frequencies in said frequency band and being included within a relatively narrow band compared to said predetermined band;
   D. a frequency-to-amplitude converter connected to said voltage controlled-oscillator to translate the instantaneous frequency thereof to a voltage having an amplitude that is a function of such frequency;
   E. a second transmission path connecting said oscillator to said converter; and
   F. visual indicating means connected to said converter to display the instantaneous amplitude of the output signal of said converter.

2. The system of claim 1 in which the signals transmitted along the first transmission path occupy predetermined frequency channels, each having a predetermined carrier frequency, and the pass band of said tunable receiving means is narrower than the frequency difference between adjacent ones of said carrier frequencies.

3. The system of claim 1 in which said tunable receiving means comprises:
   A. a mixer;
   B. a second voltage controlled oscillator connected to said mixer to supply local oscillations thereto to be mixed with received signals applied to said mixer; and
   C. a ramp signal generator connected to said second voltage controlled oscillator to supply a ramp signal thereto as a tuning signal to cause the frequency of oscillations produced by said second voltage controlled oscillator to vary in a predetermined manner to tune said tunable receiving means across said predetermined band.

4. The system of claim 1 comprising voice-grade transmission means connecting said voltage controlled oscillator to said converter, said system further comprising:
   A. an actuating signal generator located at the same end of said first transmission means as said converter; and
   B. actuating signal decoding means located at the same end of said first transmission means as said tunable receiving means to actuate the tuning of said receiving means to scan said frequency band.

5. The system of claim 1 in which there is a logarithmic transfer characteristic between the frequency of oscillations of said oscillator and the amplitude of signals received at said location.

6. The system of claim 5 in which the transfer characteristic of said amplitude responsive means is logarithmic.

7. The system of claim 5 in which a 1dB change in the amplitude of the signals received at said location and within the pass band of said receiving means causes the frequency of oscillations of said oscillator to change by a fixed number of Hz.

8. The system of claim 1 in which said second transmission path comprises audio frequency transmission means connecting said converter to said oscillator.

9. The system of claim 8 in which the frequency of oscillations produced by said oscillator is less than approximately 3KHz.

* * * * *